Sept. 29, 1936.      W. T. BRADBURY      2,055,995
HEATER OR STOVE CONSTRUCTION
Filed Sept. 29, 1934      3 Sheets-Sheet 1
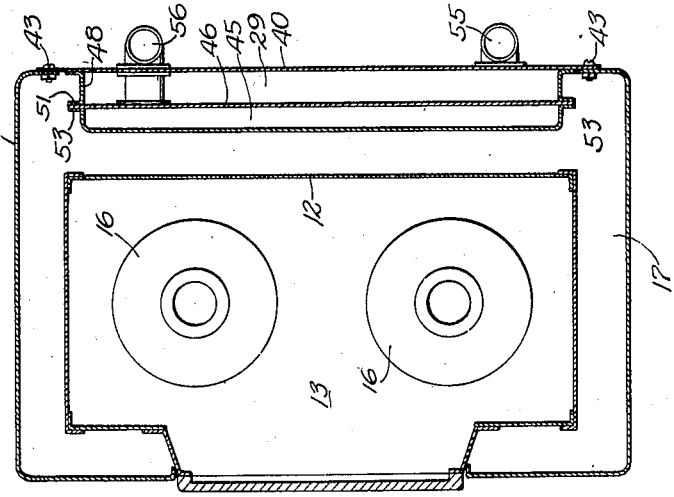
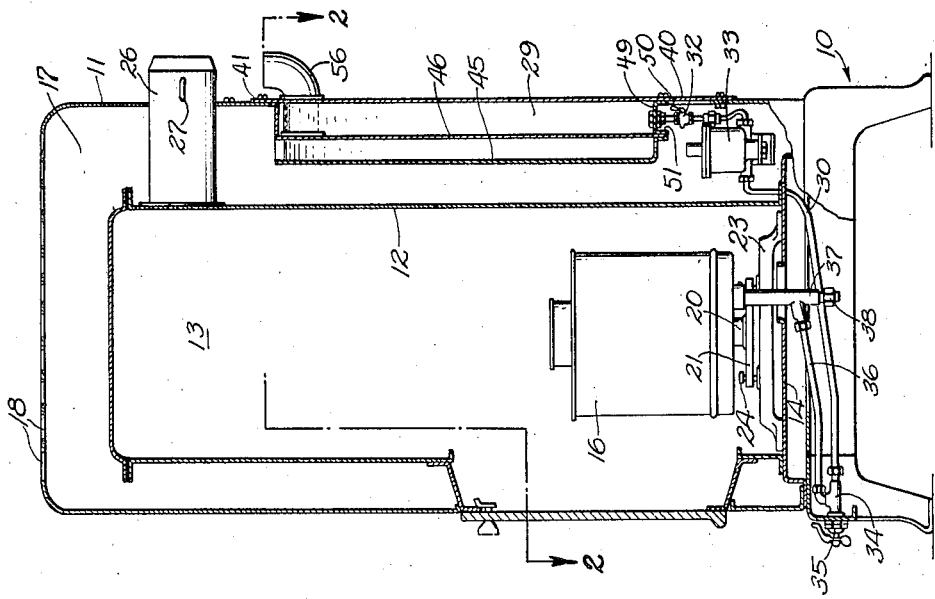
INVENTOR
William T. Bradbury
By
ATTORNEYS

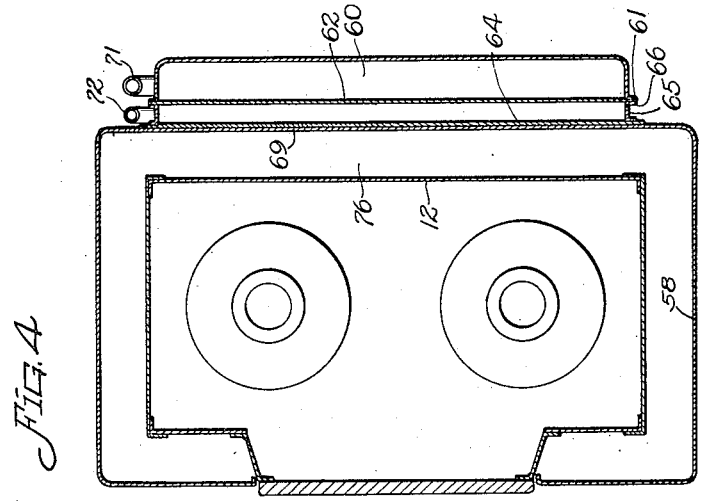
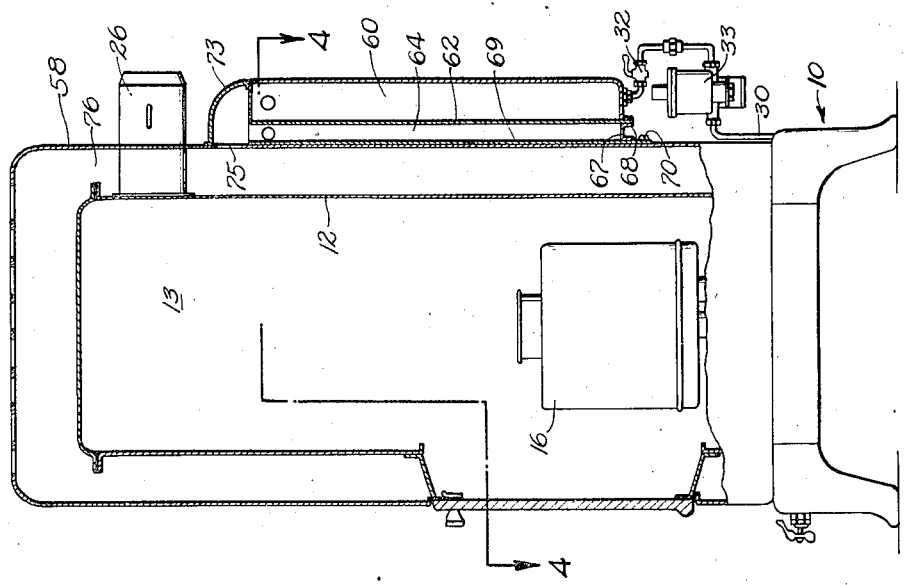

Sept. 29, 1936.  W. T. BRADBURY  2,055,995
HEATER OR STOVE CONSTRUCTION
Filed Sept. 29, 1934   3 Sheets-Sheet 3
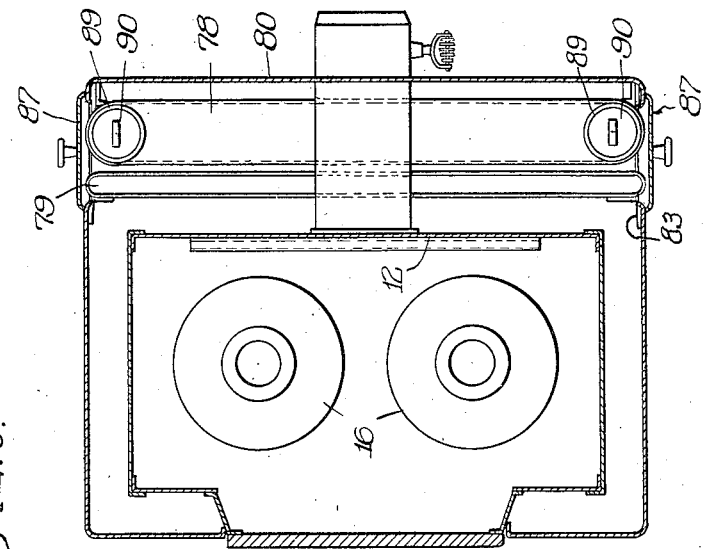
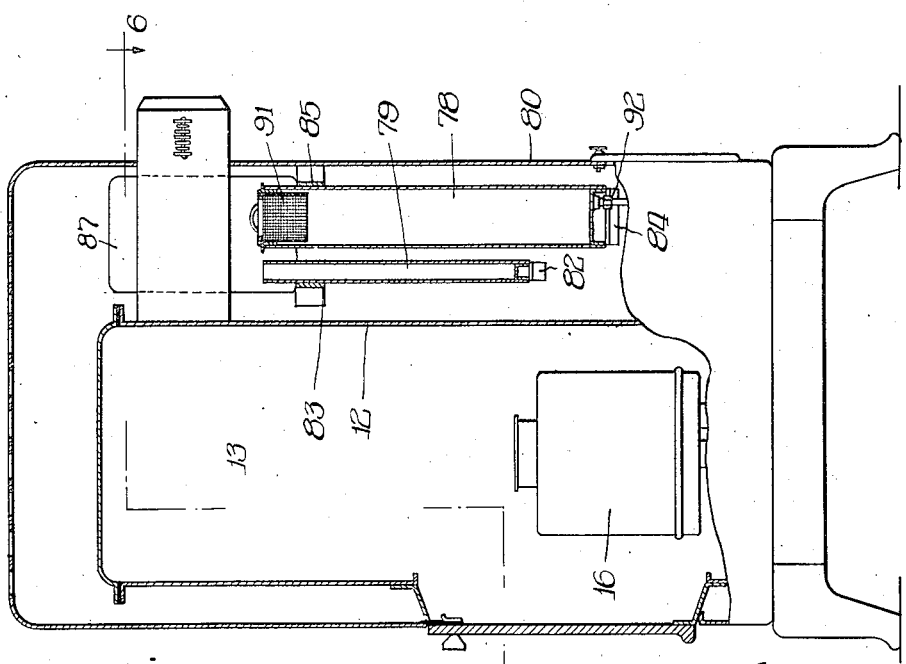
INVENTOR
William T. Bradbury
By Lindahl, Parker Carlson
ATTORNEYS Patented Sept. 29, 1936

2,055,995

UNITED STATES PATENT OFFICE 2,055,995

HEATER OR STOVE CONSTRUCTION

William T. Bradbury, Kankakee, Ill., assignor to Florence Stove Company, Gardner, Mass., a corporation of Massachusetts Application September 29, 1934, Serial No. 746,175

12 Claims. (Cl. 126—93)

This invention relates generally to improvements in heater or stove construction, and more particularly to heaters of the cabinet type wherein air circulating through the cabinet is heated by contact with the walls of a combustion chamber.

An important object of the invention is to provide a construction wherein a receptacle for receiving a substance affected by heat, such as fuel for a heater, or the like, is positioned adjacent a heat source, and in which the receptacle is shielded from the heat source by an intermediately arranged water reservoir for humidifying purposes.

Another object of the invention is to provide a heater of the cabinet type having one or more fluid fuel burners, and including a fuel tank and a humidifier reservoir in such relationship that the reservoir forms a heat insulating shield for the fuel tank.

Another object is to provide a heater of the foregoing character in which the fuel tank and the humidifier reservoir are secured together as a unit and are advantageously mounted to facilitate removal and cleaning thereof.

Another object is to provide a fluid fuel tank and an adjacent humidity reservoir adapted for use in a cabinet heater or the like, in which the reservoir is interposed between the tank and the combustion unit of the heater to provide a substantial heat insulation for the tank, and in which means are provided for easily filling the reservoir and tank and for connecting the same to the heater.

Other objects and advantages will become apparent from the following description taken in connection with the accompanying drawings which illustrate exemplary embodiments of the invention, and, in which:

Figure 1 is a sectional elevation through a heater embodying one form of the invention.

Fig. 2 is a sectional plan view taken substantially on line 2—2 of Fig. 1.

Fig. 3 is a sectional elevation through a cabinet heater embodying a modified form of the invention.

Fig. 4 is a sectional plan view taken substantially on line 4—4 of Fig. 3.

Fig. 5 is a sectional elevation through a cabinet heater embodying a further modified form of the invention.

Fig. 6 is a sectional plan view taken substantially on line 6—6 of Fig. 5.

While the invention is susceptible of various modifications and alternative constructions, I have shown in the drawings and will herein describe in detail the preferred embodiments, but it is to be understood that I do not hereby intend to limit the invention to the specific forms disclosed, but intend to cover all modifications and alternative constructions falling within the spirit and scope of the invention as expressed in the appended claims.

Generally stated, the invention is exemplified in a heating stove of the type commonly known as a cabinet heater, in which the heat is derived from one or more liquid fuel combustion units such as oil burners, and in which the fuel receptacle in the form of a suitable tank is preferably attached directly to the heater cabinet. A humidifier reservoir is arranged to emit water vapor into the heated air stream and is interposed between the tank and the heat source whereby the reservoir forms a heat insulating shield to prevent overheating of the fuel in the tank and the heat will accelerate evaporation of the water for humidification purposes.

Having particular reference to the drawings, the invention is illustrated as embodied in a cabinet heater having a base 10 supporting an upstanding outer cabinet casing 11 surrounding an inner casing 12 which latter forms a combustion chamber 13. A platform member 14 is supported on the base 10 and in turn supports the inner casing 12. Also supported on the platform 14 are one or more combustion units such as conventional oil burners 16 providing a heat source adapted to heat air which is circulated past the chamber 13 in a space 17 formed between the chamber and the outer casing 11. The air to be heated enters the space 17 through the base 10 or in any other suitable manner and is discharged through openings 18 in the upper part of the casing 11.

Each burner 16 is provided with a pedestal 20 secured to a plate 21 which is supported on a sub-base 23 on the platform 14. The plate 21 is in spaced relation to the sub-base 23 and adjustment screws 24 form the bearing support therefor and permit accurate horizontal adjustment of the burner supported by the plate to obtain the most efficient results therefrom. A flue pipe 26 provided with a damper 27 is attached to the upper end of the casing 12 and extends through the casing 11 to carry off the spent combustion gases.

Liquid fuel such as fuel oil is supplied to the burners 16 from a fuel supply tank 29 by a detachably connected oil feed line 30 including, in series, a manual shut-off valve 32 adjacent to the tank, and a conventional constant-level control device 33. The fuel oil is delivered to a suitable manifold or distributor 34, and separate manual valves 35 are associated with the distributor to control the flow of liquid fuel though separate conduits 36 leading to feed pipes 37 connected with the burners. The pipes 37 extend downwardly through the base 10 and have a plugged lower end 38 serving as clean-outs for removing carbon from the feed line adjacent to the burner.

The fuel tank 29 is preferably removably mounted on the heater and is provided with attachment flanges 40 and 41. The rear wall of the casing 11 is provided with a suitable aperture through which the tank 29 is inserted, and the attachment flanges 40 and 41 may be secured to the casing by means of suitable stove bolts 43 or the like.

A salient feature of the invention resides in the provision of a humidifier tank 45 interposed between the combustion chamber 13 and the fuel tank 29 so as to provide a rich source of water vapor to humidify the air passing through the heater and to form an insulator or shield for the fuel tank and prevent overheating of the fuel therein. To this end, the reservoir 45 may be of any desired size relative to the fuel tank but is preferably of similar lateral and vertical dimensions as the fuel tank, and may be formed as a unit therewith having a common division wall 46. Thus, the tank 29 may be provided with sides 48 and a bottom 49 provided with flanges 50 and 51, respectively, suitably secured as by welding to the edges of the division wall 46 to form a fluid-tight joint. The tank 45 may be formed as one piece having peripheral flanges 53 likewise suitably secured in fluid tight engagement with the edges of the wall 46. By means of this unit construction of the tanks 29 and 45 the same may be easily inserted in place or removed from the heater for cleaning, repairing or the like.

The upper end of the humidifier reservoir 45 is preferably open so that the water vapors may escape therefrom and co-mingle with the heated air circulating through the space 17 in the heater into which the reservoir is projected. The upper end of the fuel tank 29, however, is preferably enclosed so as to prevent volatilization and escape of the fuel therein. A filling spout 55 is attached to the tank 29 for refilling the same, and a filling spout 56 extends through the tank 29 to the water reservoir 45 in order to replenish the supply therein.

In some cases it may be desirable to provide a cabinet casing 58 of reduced depth (Figs. 3 and 4) and in such event there may not be sufficient space between the cabinet and the combustion chamber casing 12 to accommodate the oil tank and humidifier reservoir within the cabinet. Hence, a fuel tank 60 may be formed in any suitable manner, herein shown as of one piece having flanges 61 attached to a division wall member 62. A humidifier tank 64, having side walls 65 with flanges 66 and a bottom wall 67 provided with flanges 68 attached to the division wall 62, has an outer reservoir wall 69 to which the side and bottom walls 65 and 67 are suitably secured in fluid tight engagement. The wall 69 of the reservoir is secured in any suitable manner as by means of bolts 70 to a wall of the casing 58. By this arrangement the reservoir 64 forms a support for the fuel tank 60. The reservoir and tank may, however, be separately supported if desired.

A filling spout 71 is provided at one side of the fuel tank 60 and a filling spout 72 is provided at one side of the water reservoir 64. The relationship of the reservoir 64 and the fuel tank 60 in this form of the invention is similar to that of the tank 29 and the reservoir 45. Thus, the reservoir forms an insulating layer or shield between the fuel tank to prevent overheating of the fuel. In order to insure that the water vapors from the humidifier tank 64 will mingle with the heated air passing through the heater, a hood 73 is secured over the top of the tanks and the one or more openings 75 are provided in the wall of the casing 58 to permit the moisture vapor to enter a substantial air space 76 between the combustion chamber and the cabinet casing 58.

In the modified form of the invention shown in Figs. 5 and 6, the fuel tank and the water reservoir are separate tanks 78 and 79, respectively, disposed entirely within a cabinet 80 and spaced apart to permit circulation of air between the tanks. Hence, in addition to the insulation afforded by the water tank 79 for the fuel tank 78 against heat emanating from the combustion chamber 13, the air circulating between the tanks will aid in maintaining the fuel oil at a low temperature. Should the water tank 79 be allowed to run dry and thus expose the fuel tank 78 to substantially the full effects of the heat which will then pass through the empty water tank, the normal up-draft of cool air between the tanks will prevent overheating of the fuel oil.

The water tank 79 is preferably of about the same width as the fuel tank 78 to form an effective shield, and both tanks may be of substantially the interior width of the cabinet 80 and may be suitably secured at their sides for support by the sides of the cabinet. Thus, brackets 82 and 83 may be provided for connecting the tank 79 to the cabinet 80 and brackets 84 and 85 may similarly connect the tank 78 to the cabinet. For the purpose of filling the tanks the cabinet 80 is provided at each side adjacent the tops of the tanks with similar access doors 87. The humidifier tank 79 is open at the top, but the fuel tank 78 is enclosed and has filling openings 89 in its top adjacent each side and provided with suitable covers 90 which may be removed when the tank is to be filled. A screen 91 is preferably secured within each of the filling openings 89 so as to prevent foreign material from entering the tank. By having access doors 87 at each side of the cabinet, the tanks may be filled from either side, and the heater may thus be positioned closely within either a left hand or right hand corner of a room as desired. A fuel pipe 92 is detachably connected to the bottom of the fuel tank for drawing off fuel oil to be delivered to the burner 16.

The humidifier reservoir and the fuel tank is preferably of large capacity and may be mounted to permit removal for repair, cleaning, or the like. The respective tanks are compactly constructed to require a minimum of space, and by providing the same in relatively flat units, they may be inserted directly into the air circulation space within the heater cabinet or may be inconspicuously secured to the exterior of the heater. I have thus provided a simple, inexpensive and neat arrangement in which the humidifier not only serves to properly condition the air being heated, but also functions as an insulating shield for the fuel tank to avoid the danger of overheating of the oil within the latter.

I claim as my invention:

1. A heater construction comprising, in combination, a heating chamber having a liquid fuel burner therein, a cabinet in spaced relation to said chamber and providing a substantial space for the passage of air to be heated past said chamber, said cabinet having openings to facilitate the circulation of air therethrough, a liquid fuel tank and a water reservoir supported by said cabinet, and means for delivering liquid fuel from said tank to said burner, said reservoir being disposed between said tank and said chamber to form a heat insulating shield to prevent overheating of said liquid fuel and having an open upper end communicating with said space to humidify said air with the water vapors from said reservoir.

2. A cabinet heater construction, comprising, in combination, a heating chamber having a liquid fuel burner therein, means defining an air circulating space about said chamber, a pair of tanks connected together to form a unit and mounted adjacent said chamber, one of said tanks having an open top communicating with said circulating space and being placed intermediate the other tank and said chamber and adapted to receive water for humidifying the heated air passing through said heater, said other tank being enclosed and adapted to receive liquid fuel, means connecting the latter tank with said fuel burner, and means through which each of said tanks may be separately filled.

3. In a heater construction of the character described, a heating chamber having a liquid fuel burner therein, a cabinet surrounding said chamber in spaced relationship thereto and defining an air circulation passage about the chamber, a liquid fuel tank attached to said cabinet and extending inwardly thereof, means connecting said burner and fuel tank, and a humidifier tank attached to said fuel tank and forming an insulator between said fuel tank and said heating chamber, said humidifier tank communicating with said air circulation passage to humidify the air passing therethrough.

4. A cabinet heater construction comprising, in combination, a heating chamber having a liquid fuel burner therein, a cabinet surrounding said chamber in spaced relationship whereby a substantial air circulation space is provided about said chamber, the back of said cabinet having a substantial aperture formed therein, and a pair of tanks constructed as a unit and extending into said aperture and being connected to said cabinet, one of said tanks being open at the top and adapted to receive water for humidifying the air circulating through said space, said one tank being interposed between said chamber and the remaining tank and providing a heat insulating shield therefor, said remaining tank being adapted to receive liquid fuel and being connected to deliver said fuel to said burner.

5. A heater of the character described, comprising spaced inner and outer casings, said outer casing being apertured to allow free circulation of air through the space between said casings, an oil burner within said inner casing, a fuel supply tank removably supported at one side of said outer casing, a fuel supply connection between said tank and said burner including a pipe detachably connected to said tank, said outer casing having a relatively large opening therein across which said tank extends, and a water reservoir associated with said tank so as to project into the space between the inner and outer casings intermediate said tank and said burner, said reservoir having a top opening and being removable for cleaning when said fuel tank is removed.

6. In a cabinet heater of the type described, in combination, a heating chamber having a fluid fuel burner therein, means providing an air passage around said chamber, a fuel tank adjacent said chamber and connected with said fuel burner for delivering fuel thereto, a humidifier tank attached to said heater and serving as a support for said fuel tank, said humidifier tank being spaced from said chamber and disposed between said chamber and said fuel tank to intercept radiated heat from said chamber, means connecting said tanks into a unit, and means for directing water vapor from said humidifier tank to the heated air passing through said passage.

7. A stove construction comprising, in combination, a heating chamber, a liquid fuel burner in said chamber, a liquid fuel tank at one side of said chamber, and a humidifier water tank spaced from said fuel tank to allow air circulation therebetween and disposed between the latter and said chamber in spaced relation to said chamber, said water tank when filled providing a heat insulating shield for said fuel tank.

8. A stove construction comprising, in combination, a heating chamber, a liquid fuel burner in said chamber, a cabinet surrounding said chamber in spaced relation and providing an air circulation clearance, a liquid fuel tank and a humidifier water tank within said cabinet, said water tank communicating in humidifying relation at its upper end with said clearance and being located in insulating relation between said chamber and fuel tank, means connecting said fuel tank and burner, and a door in said cabinet adjacent the tops of said tanks for gaining access to said tanks to fill the same.

9. In a heater structure of the class described, a heat source, a cabinet enclosing said source to provide a substantial air circulation space, thereabout and having a substantial opening in one side, a liquid fuel tank adapted to close said opening and having means for connection with said cabinet, a water tank attached to said liquid fuel tank and adapted to extend into said cabinet to shield the latter tank from said heat source, said water tank having a top opening communicating with said circulation space for humidifying the air passing therethrough, and a filling spout extending through said liquid fuel tank to said water tank.

10. In a heater construction, a heat source, a cabinet enclosing said heat source and providing a substantial circulation chamber thereabout, a pair of flattened tanks, said tanks having a common dividing wall and being respectively adapted for containing liquid fuel and water, the water tank having an opening in the top in communication with said circulation chamber for delivering humidifying vapor to said circulation chamber and being disposed intermediate said heat source and the fuel tank so as to intercept heat and dissipate the same through water evaporation, and means on one of said tanks for attaching the tanks to said cabinet.

11. In a heater construction of the type described, in combination, a heating chamber having a fluid fuel burner therein, means enclosing said chamber and providing an air circulating passage thereabout, a fuel tank at one side of said chamber and connected with said burner for delivering fuel thereto, supporting means near said burner, and a water reservoir attached to said supporting means between said burner and fuel tank to shield the latter from direct heat and serving as a support for said fuel tank, said reservoir having an opening in its upper part communicating with said passage for humidifying the air passing through the latter.

12. A stove construction comprising, in combination, a heating chamber having combustion means therein, a cabinet surrounding said chamber in spaced relation to permit air circulation about said chamber, a fuel receptacle disposed in spaced relation at one side of said chamber within the range of heat radiated therefrom and having means providing communication with said chamber for delivering fuel thereto, and a humidifier water tank having a top opening communicating in humidifying relation with the air circulation space between said chamber and cabinet and being interposed between said chamber and said receptacle in spaced relation to said chamber so that heat from said chamber will be intercepted by the water in said water tank and shielded from said fuel receptacle.

WILLIAM T. BRADBURY.